United States Patent
Wallner et al.

(10) Patent No.: US 7,428,689 B2
(45) Date of Patent: Sep. 23, 2008

(54) DATA MEMORY SYSTEM AND METHOD FOR TRANSFERRING DATA INTO A DATA MEMORY

(75) Inventors: Paul Wallner, Prien (DE); Dominique Savignac, Ismaning (DE); Christian Sichert, München (DE); Thomas Hein, München (DE)

(73) Assignee: Infineon Technologies AG, Munich (DE)

( * ) Notice: Subject to any disclaimer, the term of this patent is extended or adjusted under 35 U.S.C. 154(b) by 567 days.

(21) Appl. No.: 11/217,081

(22) Filed: Aug. 30, 2005

(65) Prior Publication Data

US 2007/0061671 A1    Mar. 15, 2007

(51) Int. Cl.
*G06F 11/10* (2006.01)
(52) U.S. Cl. .................... 714/763; 714/773
(58) Field of Classification Search ............. 714/763, 714/773
See application file for complete search history.

(56) References Cited

U.S. PATENT DOCUMENTS

| | | | | |
|---|---|---|---|---|
| 5,987,555 A | * | 11/1999 | Alzien et al. | 710/312 |
| 6,070,262 A | * | 5/2000 | Kellogg et al. | 714/763 |
| 6,212,631 B1 | * | 4/2001 | Springer et al. | 713/1 |
| 6,279,087 B1 | * | 8/2001 | Melo et al. | 711/146 |
| 6,915,446 B2 | * | 7/2005 | Riley | 714/758 |
| 7,117,421 B1 | * | 10/2006 | Danilak | 714/763 |
| 2006/0117239 A1 | * | 6/2006 | Lin et al. | 714/758 |

* cited by examiner

*Primary Examiner*—Stephen M. Baker
(74) *Attorney, Agent, or Firm*—Brinks Hofer Gilson & Lione

(57) ABSTRACT

A method for transferring data into a data memory using a data protocol is presented. The data memory is an error correction code (ECC) memory or a non-error correction code memory. The data protocol has different frames. When data are written into an ECC memory, the protocol includes a data mask frame in which the data mask bits are replaced by ECC bits. The method is designed such that ECC and non-ECC DRAMs can be established with the same protocol and at least a similar architecture.

20 Claims, 2 Drawing Sheets

DATA MEMORY SYSTEM AND METHOD FOR TRANSFERRING DATA INTO A DATA MEMORY

TECHNICAL FIELD

The present invention relates generally to memory devices and more particularly to DRAM data memories and to a method for transferring data into a DRAM.

BACKGROUND

Main memories of computer systems are generally formed using dynamic semiconductor memory chips (DRAM). For this purpose, a number of memory chips are combined on a small circuit board as a memory module. At least a portion of such memory modules then forms the main memory.

In the case of high-quality computer systems, such as network servers or workstations, the memory must be comparatively free of errors compared to a relatively simple computer system such as a desktop computer. All RAM memories experience occasional errors due to factors such as power fluctuations, static electricity discharges, faulty components or improper system timing. However, in some computer systems the stored data should be relatively free from errors. For this reason, these computer systems have so-called error correction devices which, upon storage of data in the main memory, generate one or more error correction bits (ECC bits or ECC information) per data record and transfer this information so that it is stored together with the data to be stored in the main memory. Correspondingly, when data stored in the main memory are read out, the associated ECC information is also read out and transferred to an error correction device for corresponding evaluation and, if necessary, error recovery.

So far, the focus of memory manufacturers has only been on non-ECC future DRAMs. In these DRAMs, an error correction code information is not stored together with the data. Additionally, a protocol has been defined for this non-ECC DRAM type. The protocol determines the structure of the data to be stored in the DRAM.

However, the current protocol definition does not allow inclusion of ECC information. Instead, to include this information the protocol, general frame structure, or pin count must be completely changed. Such changes lead to major architectural changes and to different architectures for non-ECC and ECC DRAMs. This is a serious cost factor, as different protocols would then be implemented for the different types of DRAMs.

It is thus apparent that a need exists to provide addressing of a data memory with a single type of protocol.

SUMMARY

This need is met by a method for transferring data into a data memory and by a data memory system as mentioned in the independent claims. In the dependent claims preferred embodiments of the invention are described.

In an embodiment of the present invention a method for transferring data into a data memory using a data protocol is provided. The data memory is either an error correction code (ECC) memory or a non-error correction code memory. The protocol organizing the data exchange comprises preferably different frames, wherein, when data are written into an error correction code memory, the protocol comprises at least one data mask frame, in which the data mask bits are replaced by ECC bits. According to the invention, the data mask bits provided in the former data mask frame (also called partial write data frame) are substituted by the ECC bits. The general protocol format can remain unchanged. The general frame size and most of the different frame type definitions are not changed. The protocol for non-ECC DRAMs may comprise one optional frame providing data mask information. For ECC DRAMs the data mask bits are not relevant and may be exchanged with ECC bits, and the occurrence of this additional frame is mandatory.

According to a preferred embodiment, the data mask frames are optional when data are written in non-ECC memory. If the data mask frame is present in the protocol for a non-ECC memory the data mask frame comprises data mask bits. Accordingly, for non-ECC DRAMs the frame, the so-called partial write data or data mask frame is not mandatory, but optional. If present, this data frame comprises data mask bits.

According to a preferred embodiment, the number of ECC bits provided in the data mask frame for an ECC memory corresponds to the number of data mask bits provided in the data mask frame for a non-ECC memory.

Preferably the ECC bits are stored in the ECC memory together with the other data bits provided in the frames of the protocol which should be written into the DRAM memory. When the stored data bits are read out from the DRAM, the ECC bits are read out from the ECC memory together with the other data bits.

Preferably, when transferring data to the data memory, the data are transmitted to a frame decoder. From the frame decoder the data are transmitted to a posted write buffer, and finally from the posted write buffer the data are written into the DRAM core.

As mentioned above, the ECC bits are read from the ECC memory together with the other data bits, when the data are read out from the memory. In case the memory is a non-ECC memory, no ECC data bits are provided, and the other data bits stored in the memory are read from the memory. For the data bits read out from the memory a cyclic redundancy check (CRC) can be performed, and cyclic redundancy check bits can be calculated and added to the data bits read from the memory.

According to the current specification, data and data mask bits are written into the posted write buffer. For an ECC DRAM, this would ean that data and ECC information are written into the posted write buffer instead thereof, and data and ECC bits are read out and both are provided to the memory controller.

For a non-ECC DRAM data are read out, CRC bits are calculated from these data bits, and both, data and CRC bits, are provided to the memory controller. With respect to the read data frame definition CRC bits are replaced by the ECC bits.

The invention further relates to a data memory system comprising a memory controller and a data memory, data being transferred between the memory controller and the data memory using a data protocol. The protocol structure comprises different frames. The data memory is configured in such a way that it either comprises an error correction code (ECC) information or it does not comprise an ECC information. When data are transmitted to a data memory comprising ECC information, the protocol comprises at least one data mask frame in which the data mask information is replaced by the ECC information. Accordingly, the architecture of the data memory system and of the protocol for the data exchange can remain almost unchanged and ECC and non-ECC DRAMs can be covered in one architecture. This helps to provide a cost-effective data memory system as less design and validation efforts are needed due to a similar and actually even identical protocol structure (instead of CRC bits for ECC DRAMS ECC bits already exist. For the protocol layer this makes no difference. They are treated for frame decoding in the same way.).

The data memory system may further comprise a frame decoding unit for decoding the frames comprised in the protocol. Additionally, a buffer in the form of a posted write buffer (PWB) receiving the data from the frame decoding unit may be provided. The output of the posted write buffer are data and data mask signals to be stored in the DRAM core. The output of the posted write buffer of an ECC DRAM are data and ECC signals. The respective data are then transmitted to the DRAM core.

The data memory system may further comprise a cyclic redundancy check data generating unit which generates cyclic redundancy check data when data are read from a non-ECC DRAM. The data generating unit adds the cyclic redundancy check data to the data read from the data memory.

The foregoing summary has been provided only by way of introduction. Nothing in this section should be taken as a limitation on the following claims, which define the scope of the invention.

DETAILED DESCRIPTION

Figure 1:
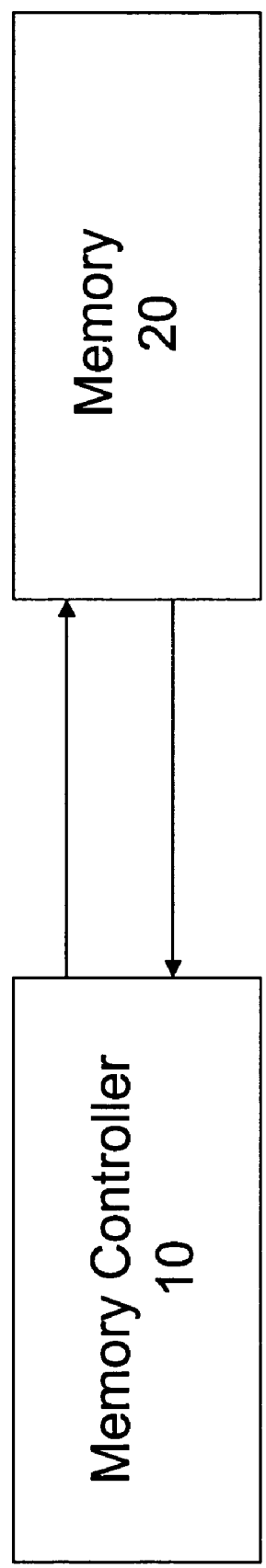
FIG. 1 illustrates a block diagram of the memory system according to an embodiment of the present invention.

In FIG. 1 a memory controller 10 is shown which controls the data exchange between the memory controller 10 and the memory 20. Data can either be read from the memory 20 or can be transferred into the memory 20. In one embodiment, the memory is a DRAM which may be used as a main memory of a computer system. When the memory 20 is used in a high-quality computer system such as a network server, the memory requirements in terms of freedom from errors may be more stringent then those for a relatively simple computer system. If the integrity of the data stored in the memory is of great importance, one type of memory used may be an ECC memory. If the integrity of the data does not have a high priority, the memory 20 may be a non-ECC memory.

The data exchange between the memory controller 10 and the memory 20 is performed via a data exchange protocol. The protocol comprises different frames, such as command frames, write data frames, and optionally a partial write data or data mask frame. By way of example, for transferring the data, six pins may be provided for the data exchange, 9 bits being transmitted via each pin, so that 54 bits may be comprised in one frame. If, by way of example, 128 bits of write data are to be written into the memory, three write data frames are thus used to transmit the 128 bits, e.g. one data frame of 42 bits and two data frames of 43 bits. When the memory is an ECC memory, the protocol comprises another frame, normally providing data mask information, the so-called partial write data or data mask frame. For an ECC DRAM memory, the data mask bits are exchanged with ECC bits and the occurrence of this frame as fourth write data frame is mandatory. In the present example, the data mask bit frame may comprise 16 ECC bits. If the data are written into a non-ECC memory, this additional frame providing data mask information is optional. If it is provided, this frame comprises data mask bits. In the above case this additional frame comprises 16 data mask bits. However, the protocol does not necessarily comprise this additional frame. If the additional data mask frame is not sent, the data mask signals are zero.

Figure 2:
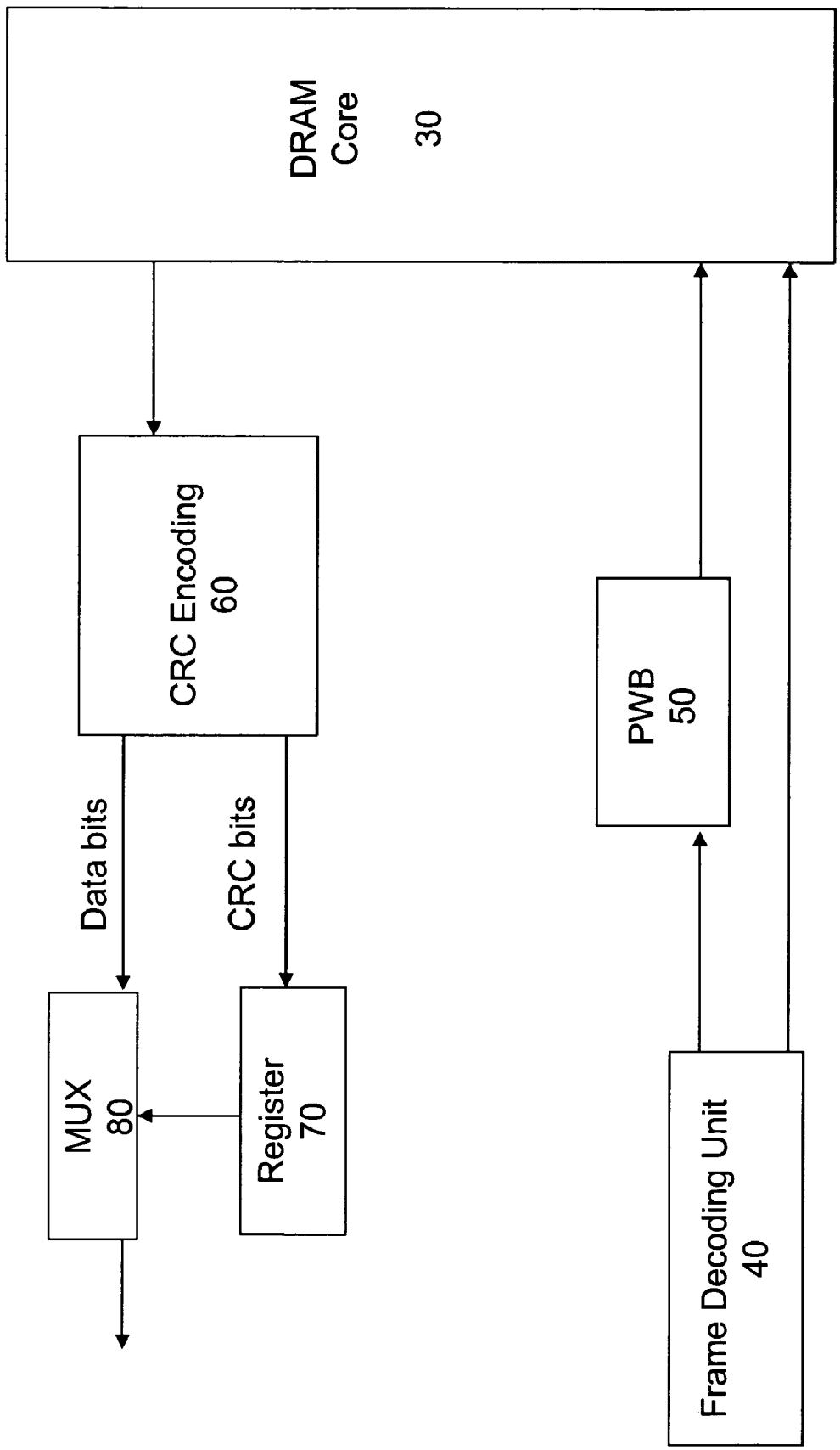
FIG. 2 illustrates another block diagram of the memory system according to an embodiment of the invention.

Another embodiment of the invention is shown in FIG. 2. As illustrated, the protocol for the data exchange between a memory controller (not shown) and the DRAM 30 is fed to a frame decoding unit 40 (frame decoder), in which the different frames comprised in the protocol are decoded. The write data frames are transmitted to a posted write buffer (PWB) 50, from which the data are transmitted to the DRAM core 30. If 128 data bits are to be written into the DRAM core, three write data frames may be transmitted to the posted write buffer 50. If the DRAM is an ECC DRAM, the ECC information is also transmitted to the PWB 50, from where it is transmitted to the DRAM core 30. The ECC information is then stored together with the data to be stored. When the DRAM is a non-ECC DRAM, the additional frame providing data mask information is optional. If the additional data mask frame is provided, this frame comprises the data mask signals. If the additional data mask frame is not provided in the protocol, the data mask signals are set to be zero. Summarizing, for an ECC DRAM, the data mask bits are substituted by ECC bits so that the output of the posted write buffer for an ECC DRAM are data and ECC signals. The output of the posted write buffer 50 for a non-ECC DRAM are data and data mask signals. Preferably, the number of ECC bits and the number of data mask bits are equal.

The data stored on the DRAM 30 are read out from the DRAM 30 and are transmitted to a controller or a CRC encoding unit 60. For a non-ECC DRAM, there is no information provided in the data which helps to verify the integrity of the data. To this end, a CRC (cyclic redundancy check) encoding unit 60 is provided which generates CRC information. The CRC information can help to check the integrity of the stored data.

When the DRAM is a non-ECC DRAM, the CRC signal (CRC bits) generated by the CRC encoding unit 60 is transmitted to a CRC register 70, the signal data or stored data bits being directly transmitted to a multiplexer 80, where the signal data are combined with the CRC data. For the above example of 128 data bits, these data bits may be transmitted in two frames. For each frame, 8 CRC bits are generated, so that in total 16 CRC bits are generated.

For an ECC DRAM, the signal data bits are read out from the DRAM 30 together with the ECC information. It is thus not necessary to generate a CRC signal. For the above example of 128 data bits which are transmitted in two frames, each frame comprises 8 ECC bits. The CRC encoding path is not used for ECC DRAMs because both data and ECC bits are provided by the DRAM core 30.

The foregoing disclosure of the embodiments shows that a common approach for a non-ECC and ECC DRAMs is provided from a protocol definition point of view. For an ECC DRAM memory, the ECC bits substitute the data mask bits in the data mask frame, whereas the general frame formats in the different protocols remain nearly unchanged. This approach permits the architecture to remain almost unchanged due to nearly identical frame types. Additionally, ECC and non-ECC DRAMs can be covered in a single architecture, which reduces the cost. The DRAM interface can remain unchanged and the protocol has no impact on the pin count.

It is not intended to limit the present invention to the precise forms disclosed. Any variations and modifications of the embodiments described herein will be apparent to one of ordinary skill in the art in light of the above disclosure. Especially the number of frames and the number of data bits, ECC bits or data mask bits may vary and be chosen in accordance with the embodiments. It is therefore intended that the foregoing detailed description be regarded as illustrative rather than limiting, and that it be understood that it is the following claims, including all equivalents, that are intended to define the spirit and scope of this invention. Nor is anything in the foregoing description intended to disavow scope of the invention as claimed or any equivalents thereof.

The invention claimed is:

1. A method for transferring data into a data memory using a data protocol, the data memory being an error correction code (ECC) memory or a non-ECC memory, the data protocol comprising different frames, comprising replacing data mask bits in a data mask frame of the data protocol by ECC bits when data are written into an ECC memory.

2. The method according to claim 1, wherein the data are written into a DRAM.

3. The method according to claim 2, further comprising:
transmitting the data to a frame decoder,
transmitting the data from the frame decoder to a posted write buffer, and
writing the data from the posted write buffer into the DRAM.

4. The method according to claim 1, wherein the ECC bits are stored in the ECC memory together with other data bits provided in the frames of the data protocol.

5. The method according to claim 4, further comprising reading data from the data memory, wherein, when the data memory is an ECC memory, the ECC bits are read from the ECC memory together with the other data bits.

6. The method according to claim 1, wherein, when data are written into a non-ECC memory, the data mask frame is optional, and if the data mask frame is present, the data mask frame comprises data mask bits.

7. The method according to claim 6, wherein the number of ECC bits corresponds to the number of data mask bits.

8. The method according to claim 6, further comprising reading data from the data memory, wherein, when the data memory is a non-ECC memory, other data bits provided in the data protocol and stored in the data memory are read from the data memory, and cyclic redundancy check bits are calculated and added to the other data bits read from the data memory.

9. A data memory system comprising:
a memory controller; and
a data memory connected with the memory controller such that data is transferred between the memory controller and the data memory using a data protocol, the data protocol comprising different frames,
wherein the data memory is configured to contain error correction code (ECC) information or to not contain error correction code information, and when data are transmitted to a data memory containing ECC information, the data protocol includes a data mask frame in which data mask information is replaced by the ECC information.

10. The data memory system according to claim 9, further comprising a frame decoding unit that decode the frames in the data protocol.

11. The data memory system according to claim 9, further comprising a posted write buffer that receives the data from the frame decoding unit.

12. The data memory system according to claim 9, further comprising a cyclic redundancy check (CRC) data generating unit that generates CRC data when data are read from the data memory that does not contain ECC information and that adds the CRC data to data read from the data memory.

13. The data memory system according to claim 12, wherein the CRC data generating unit comprises a CRC encoding unit that generates the CRC data, a register that stores the CRC data, and a multiplexer that combines data from the CRC encoding unit and CRC data from the register.

14. A method for transferring data into a data memory comprising at least one of an error correction code (ECC) memory or a non-ECC memory, the method comprising:
selecting a data protocol dependent on the type of data memory in which data is to be stored;
determining whether to use a data mask frame of the data protocol when data are written into a non-ECC memory, the data mask frame containing data mask bits; and
using the data mask frame, and replacing the data mask bits in the data mask frame with ECC bits, when data are written into an ECC memory.

15. The method according to claim 14, further comprising:
transmitting the data to a frame decoder,
transmitting the data from the frame decoder to a posted write buffer, and
writing the data from the posted write buffer into the DRAM.

16. The method according to claim 14, further comprising:
reading data from the non-ECC memory such that other data bits provided in the data protocol and stored in the data memory are read from the data memory;
calculating cyclic redundancy check (CRC) bits; and
combining the CRC bits with the other data bits read from the data memory.

17. The method according to claim 14, wherein the data protocol further comprises at least one of a command frame or a write data frame.

18. The method according to claim 14, further comprising maintaining substantially the same data protocol independent of whether an ECC memory or a non-ECC memory is used.

19. The method according to claim 14, further comprising storing the ECC bits in the ECC memory together with other data bits provided in other frames of the data protocol.

20. The method according to claim 19, further comprising reading data from the ECC memory such that the ECC bits are read from the ECC memory together with the other data bits.

* * * * *